(12) United States Patent
Chambrion et al.

(10) Patent No.: US 10,006,500 B2
(45) Date of Patent: Jun. 26, 2018

(54) TWO-STAGE CLUTCH

(71) Applicant: Schaeffler Technologies AG & Co. KG, Herzogenaurach (DE)

(72) Inventors: Martin Chambrion, Erstein (FR); Christoph Raber, Ottweiler-Steinbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 311 days.

(21) Appl. No.: 14/889,687

(22) PCT Filed: May 6, 2014

(86) PCT No.: PCT/DE2014/200198
§ 371 (c)(1),
(2) Date: Nov. 6, 2015

(87) PCT Pub. No.: WO2014/180479
PCT Pub. Date: Nov. 13, 2014

(65) Prior Publication Data
US 2016/0123407 A1    May 5, 2016

(30) Foreign Application Priority Data

May 6, 2013   (DE) ........................ 10 2013 208 194

(51) Int. Cl.
*F16D 21/08*   (2006.01)
*F16D 13/04*   (2006.01)
(Continued)

(52) U.S. Cl.
CPC ............. *F16D 21/08* (2013.01); *F16D 13/04* (2013.01); *F16D 13/40* (2013.01); *F16D 13/583* (2013.01); *F16D 13/72* (2013.01); *F16D 2300/26* (2013.01)

(58) Field of Classification Search
CPC ........ F16D 21/08; F16D 13/40; F16D 13/583; F16D 13/72; F16D 2300/26
See application file for complete search history.

(56) References Cited

U.S. PATENT DOCUMENTS 8,464,852 B2   6/2013   Simon et al.
2002/0027034 A1*  3/2002  Tsutsumikoshi ....... B62K 11/10
                                                180/227
(Continued)

FOREIGN PATENT DOCUMENTS

CN      102963246        3/2013
DE      102010048829 A1   5/2011
(Continued)

*Primary Examiner* — Huan Le
(74) *Attorney, Agent, or Firm* — Brooks Kushman P.C.

(57) ABSTRACT

A two-stage clutch for separable connection of an input shaft to at least one output shaft, having a clutch cover, a clutch basket and a plurality of partial clutches, the partial clutches being operated in series. A first partial clutch is a pilot clutch, which is actively operable. A second partial clutch is a main clutch, which is operable by the pilot clutch, an operating force for the main clutch being produced by a torque transmitted by a shaft. In this two-stage clutch, the clutch cover is firmly connectible to the clutch basket. With the two-stage clutch proposed here, high torques can be transmitted despite small external operating forces. At the same time, the construction and assembly are greatly simplified in spite of the considerable complexity of the two-stage clutch, and the two-stage clutch has a significantly reduced rotating mass.

17 Claims, 5 Drawing Sheets

(51) Int. Cl.
 *F16D 13/40* (2006.01)
 *F16D 13/58* (2006.01)
 *F16D 13/72* (2006.01)

(56) References Cited

U.S. PATENT DOCUMENTS

2008/0054000 A1* 3/2008 Goldman ................ F16K 35/10
 220/360
2009/0008207 A1* 1/2009 Hirota .................... F16D 13/72
 192/70.12

FOREIGN PATENT DOCUMENTS

| | | | |
|---|---|---|---|
| DE | 102012201218 A1 | 8/2012 | |
| GB | 2251465 A * | 7/1992 | ............ F16D 13/04 |
| GB | 2251465 A | 7/1992 | |
| JP | 2005220929 | 8/2005 | |

* cited by examiner

TWO-STAGE CLUTCH

CROSS-REFERENCE TO RELATED APPLICATIONS

The present application is the U.S. national stage application pursuant to 35 U.S.C. § 371 of International Patent Application No. PCT/DE2014/200198, filed May 6, 2014, which application claims priority from German Patent Application No. 10 2013 208 194.4, filed May 6, 2013, which applications are incorporated by reference in their entireties.

BACKGROUND OF THE INVENTION

The invention relates to a two-stage clutch for separable connection of an input shaft to at least one output shaft, in particular a booster clutch for a motorcycle.

For many applications it is desired that a clutch be able to be operated by hand. That is, the forces for engaging and disengaging the clutch must be small enough so that they are controllable without exerting additional mechanical force. But, specifically, when transmitting high torques and/or when little construction space is available for a complex lever arrangement, the necessary clamping forces and low operating forces cannot be reconciled. To solve this problem, so-called booster clutches are known, in which a main clutch is controlled by a booster clutch. The forces for clamping are produced by the torque which is present to be transmitted, for example, by means of a ramp system which converts part of the available torque to a clamping force. But, because-especially in motor vehicles—a torque is to be transmitted not only in one direction but also in the opposite direction, for example, in deceleration mode, the ramp system must be operable in two opposite engaging positions. So that no jerky changeover from the first position to the second position of the ramp system occurs when changing between the two operating modes of the clutch, a torque sensor is provided. The latter ensures that when there is a decrease in the currently present torque in the one direction, the present clamping force, and thus the relative position of the ramp elements of the ramp system, is gradually adapted, that is, gradually disengaged. Such a booster clutch can thus be utilized like a conventional clutch. Of course, the construction of such a booster clutch is very complex, and furthermore is too expensive for many applications.

SUMMARY OF THE INVENTION

Starting from that basis, the object of the present invention is to at least partially overcome the disadvantages known from the prior art.

The invention relates to a two-stage clutch for separable connection of an input shaft to at least one output shaft, which has a clutch cover, a clutch basket and a plurality of partial clutches, the partial clutches being operated in series. A first partial clutch is a pilot clutch, which is actively operable. A second partial clutch is a main clutch, which is operable by the pilot clutch, an operating force for the main clutch being produced by a torque transmitted by a shaft. In this two-stage clutch, the clutch cover is firmly connectible to the clutch basket.

The two-stage clutch is set up to connect an input shaft separably to at least one output shaft. In this case, the input shaft in the main situation is the shaft from which a torque is to be transmitted to the output shaft. It is not ruled out here however, nor is even desired, that a reversed passage of torque from the output shaft to the input shaft occurs. To that end, the two-stage clutch has a plurality of partial clutches which are operated one after the other in series, so that by engaging the first partial clutch, the pilot clutch, the second partial clutch is engaged. The pilot clutch is actively operable in this case; that is, it can be operated at the command of a user according to a rule or arbitrarily. On the other hand, the main clutch is dependent on the state of the pilot clutch. That is, only when the pilot clutch is engaged is the main clutch also activated. In this case, the requisite clamping force is produced with the aid of the torque that is to be transmitted, for example, in that ramp elements of the ramp system are moved by means of a ramp running in the clamping direction. This general arrangement is situated in a clutch basket, which is closed by a clutch cover. In order to achieve a modulation of the clamping force, in the prior art a modulating spring was provided, which was provided between the clamping plate and the clutch cover. Thus, a relative movement between the clutch cover and the clutch basket was necessarily ensured. In the two-stage clutch proposed here, the clutch cover is firmly connectible to the clutch basket. The clutch cover is thus only an abutment for an actuating device, for example a diaphragm spring, and not a lever element for actuating the pilot clutch. This makes the two-stage clutch more robust overall, and simpler to assemble.

According to another embodiment of the two-stage clutch, a modulating spring to modulate the transmission of force when operating one of the partial clutches is located between the clutch basket and a plate carrier of the main clutch.

In this arrangement, the modulating spring is connected to the pilot clutch only indirectly through the driver plates of the main clutch, which are attached in the clutch basket so that they are axially movable. Therefore, not only is an advantageous flow of force in the clutch basket is achieved, but in addition the pilot clutch is no longer modulated by itself, but the entire clutch system is operated in series.

According to another embodiment of the two-stage clutch, the two-stage clutch is a wet friction clutch, and in particular the liquid coolant can be brought into the main clutch from a hollow shaft through at least one window in a transmitting element between the pilot clutch and the main clutch.

A two-stage clutch is utilized in particular for high-power drives. In order to be able to dissipate the increased frictional force of such a two-stage clutch, which is mainly converted to heat, it is proposed that the two-stage clutch is realized here as a wet friction clutch. That is, at least part of the elements of the two-stage clutch is in an oil bath, which is implemented in particular to dissipate the heat. In particular, the liquid coolant can enter the main clutch through a window in a transmitting element between the pilot clutch and the main clutch. In this case, the liquid coolant is brought through a hollow shaft, for example through the input shaft or the output shaft, which is firmly connected either to the clutch basket or to the friction plates. In a simple transfer from known wet clutch systems to a two-stage clutch, the liquid coolant arrives at the main clutch already warmed, because it is first routed through the pilot clutch. This is detrimental, because here is where the main power is transmitted and thus also where the most heat is generated, and thus where the most heat has to be dissipated. In the two-stage clutch proposed here, the transmitting element is not a closed design, and by particular preference is formed by a plurality of spacer bolts, so that a window is made through which the liquid coolant can flow freely and arrive at the main clutch in a cooler state.

According to another advantageous embodiment of the two-stage clutch, the clutch basket is produced by cold rolling, and in particular is produced using a reduced mass.

In this advantageous embodiment, the strength of the clutch basket is increased so that the number of burst protection rings can be reduced or the use of burst protection rings is even superfluous. Burst protection rings are necessary on conventional clutch baskets, in which the clutch basket wall is formed by a plurality of bent strips. With the clutch basket proposed here, produced by cold rolling, it is not merely possible to form non-bent strips, but to form a coherent pot structure which is itself capable of absorbing circumferential stresses. In particular, the masses of such a clutch basket can be reduced, for example by means of a thinner material, openings, stiffeners and by producing creases and crosspieces.

According to another aspect of the two-stage clutch, the pilot clutch is controllable on a pull basis by means of a diaphragm spring.

In the existing art heretofore, two-stage clutches were always designed as push clutches. The disadvantage here is that the correspondingly involved components have to be designed for bending or buckling. In particular with the clutch cover firmly connected to the clutch basket, it is possible to operate the diaphragm spring in pull mode. This causes mainly tension loads to occur, so that a significantly lesser strength of the (metal) components is requisite. Moreover, the pull version has the advantage that the diaphragm spring is supported on the clutch cover not at a central lever point (or lever line) but on an abutment located on the outside of the clutch cover. This enables a larger inside diameter of the clutch cover to be chosen, and thus material and weight are saved.

According to another embodiment of the two-stage clutch, the pilot clutch forms a separate module.

As already described above, the construction of a two-stage clutch is extremely complex compared to a conventional friction clutch. Nevertheless, the assembly and disassembly of a two-stage clutch should be kept simple. In particular when used in motorcycles, the user of the motorcycle is accustomed to making repairs to that motorcycle himself/herself. In particular, it must be possible to replace the plates of the main clutch because they absorb the main load and are therefore subject to the greatest wear. It is proposed here that the two-stage clutch be set up so that the pilot clutch forms a coherent separate module. This means that the pilot clutch can be detached as a whole from the rest of the two-stage clutch, using simple means. In particular, the adjustments within the pilot clutch remain uninfluenced when this is done. In this case, it is very particularly preferred that the provided torque sensor, if any, is also contained in the separate module. Thus this torque sensor, which is calibrated and adjusted using precision settings, also does not have to be set up again, despite disassembly and reassembly of the two-stage clutch. The design of these partial clutches as separate modules has the additional advantage that they can also easily be tested separately. In particular, the pilot clutch can be tested contrary to its operating direction when installed, like a push clutch, although it is, for example, a pull clutch. Testing of a push clutch is the standard at present, so that testing means which the user already has on hand can continue to be used.

According to another advantageous embodiment of the two-stage clutch, the clutch cover is connectible and fixable on the clutch basket by means of a bayonet lock, and in particular it has a plurality of openings in a disk of the pilot clutch which correspond to at least one lug on the main clutch.

To make it possible to assemble the clutch cover without great effort and expense, it is proposed here that the two-stage clutch is connected to the clutch basket by means of a bayonet lock. The advantage of this is that the clutch cover can be attached to the clutch basket against the spring tension, and is secured axially against the spring forces behind the undercuts of the bayonet lock by a simple twisting of the clutch cover. As a result, the clutch cover can be held in its intended position without exerting force. For example, one or more retaining screws may be provided. A problem with this assembly step is that the position of the ramp elements of the ramp system is not firmly defined. The pilot clutch, which is positioned over the clutch cover using the clutch basket and at the same time is positioned using the ramp system, is therefore difficult to set up. To this end, it is proposed that the ramp system is provided with at least one pin, which may be inserted alternatively into a plurality of openings, in particular in a disk of the pilot clutch. As a result, a plurality of discrete positions of the pilot clutch is defined by means of the pin and the plurality of openings. For example, 36 openings may be provided, so that discrete positions at intervals of 10° are provided. This makes it possible to prevent the incorrect assembly of the pilot clutch.

According to another advantageous embodiment of the two-stage clutch, a transmitting element can be centered between a first ramp element and the main clutch by means of the diaphragm spring.

Because of the many individual components of the two-stage clutch, these components must each be centered with respect to each other. But it is disadvantageous to center the components with respect to each other in the order in which they are installed. This results in sequential centering in which tolerances and deviations accumulate. Even if it is urgently necessary in a clutch that all elements are centered free of imbalances, care must be taken that the main elements of the clutch are not connected to each other through a series of centerings. It is therefore proposed here that the diaphragm spring is centered with the clutch basket by means of the clutch cover. The transmitting element between a first ramp element of the ramp system and the main clutch, which transmitting element advantageously accommodates the torque sensor, is centered by means of the diaphragm spring. As a result, the pilot clutch and the transmitting element are centered by means of the diaphragm spring and are parallel in their centering. Thus the tolerances and deviations of the centering are not additive.

According to another advantageous embodiment of the two-stage clutch, the clamping force produced is absorbed in the clutch basket, and in particular a torque sensor is not detachable from the ramp system without destruction.

In a conventional configuration, the clamping force produced by the torque of the drive system remains in the plate basket of the main clutch. The result is that the complete clutch core must be removed during disassembly. This is not necessary in the case of the two-stage clutch proposed here, because the clamping force of the main clutch is absorbed in the clutch basket. As a result, the main clutch lies in the clutch basket free of tension after removal of the pilot clutch. In addition, this configuration makes it possible to connect the torque sensor firmly to the ramp system, which can thus be realized as a single module, which can be removed separately, for example, when replacing the plates of the main clutch. In particular, the torque sensor can be firmly riveted to the ramp system or to a ramp element of the ramp system. Therefore, the adjustments and setup of the torque sensor can be preserved even in the event of assembly and disassembly.

According to another aspect of the invention, a motorcycle is proposed which has a drive unit with an output shaft, a drivetrain, and a two-stage clutch according to the above description to connect the output shaft to the drivetrain separably, the pilot clutch being operable in particular by hand.

A motorcycle designates a two-wheel, three-wheel or four-wheel vehicle or the like, which is driven by a drive unit, for example an internal combustion engine or an electric motor. In the case of a two-wheeled cycle, for example, the drivetrain consists of a shift transmission and a chain drive or belt drive, which drives the rear wheel of the two-wheeled cycle for example. The output shaft, which delivers the torque of the drive unit, is separably connected to the drivetrain through the two-stage clutch. In modern motorcycles, the torques that are delivered by means of the drive shaft are very high and must be transmitted by means of a correspondingly high-performance friction clutch. This frequently requires the realization of very high clamping forces, which cannot be produced or surmounted by standard lever devices and the strength of the motorcycle operator. As a result, it is appropriate here to use a two-stage clutch, with which it is only necessary to come up with the force to operate a pilot clutch. In this case, the force to engage the main clutch is supplied by the drive unit itself by means of a ramp system by operating the pilot clutch, and thus sufficient clamping force can be produced overall. The two-stage clutch proposed here has the function that it can be operated both in traction mode and in deceleration mode. In addition, by means of the torque sensor, it has an anti-hopping function, which prevents blocking of the drive wheel as a result of a (jerky) reversal of torque. Despite its considerable complexity, the two-stage clutch proposed here is easy to service, has a relatively small number of parts, and can be integrated without additional measures into a conventional motorcycle, especially one that is set up for pull-type clutches.

The features described herein can be combined with each other in any technologically reasonable way, and can be supplemented by explanatory facts from the description and details from the figures, in which case additional variant embodiments of the invention will be shown.

BRIEF DESCRIPTION OF THE SEVERAL VIEW OF THE DRAWINGS

The invention as well as the technical environment will be explained in greater detail below on the basis of the figures. The figures show especially preferred exemplary embodiments, to which the invention is not limited however. In particular, it must be pointed out that the figures, and especially the depicted size proportions, are only schematic. The figures show the following.

DETAILED DESCRIPTION OF THE INVENTION

Figure 1:
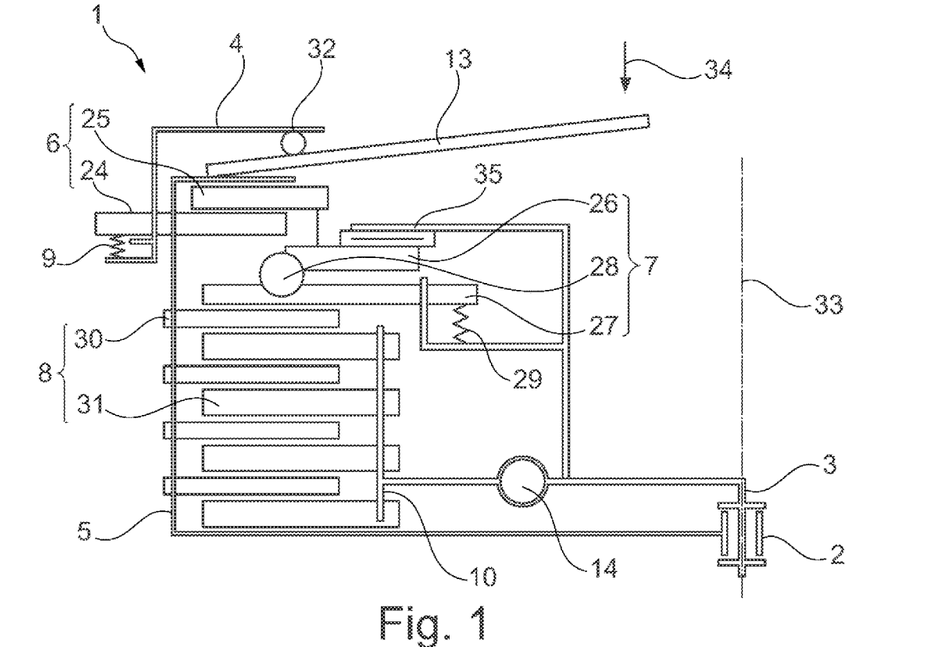
FIG. 1 is a diagram of a conventional push-type two-stage clutch.

FIG. 1 shows a diagram of conventional two-stage clutch 1. The elements of two-stage clutch 1 are rotary-supported around axis of rotation 33. This two-stage clutch is realized in a push version; that is, diaphragm spring 13 is pressed in activation direction 34 to release pilot clutch 6. To this end, the diaphragm spring rests against clutch cover 4 through fulcrum 32 and lowers clamping plate 24 away from counter plate 25, which are normally frictionally engaged. In other words, clutch cover 4 is raised relative to clutch basket 5 against modulating spring 9. Consequently, first ramp element 26 of ramp system 7 which is firmly connected to counter plate 25 is no longer driven. As a result, clamping element 28 which is pre-stressed against the engaged position by bias spring 29 returns to the disengaged position, and second ramp element 27 is no longer driven and disengages from main clutch 8. A plurality of driver disks 30 and plates 31 of main clutch 8 disengage from each other, and a torque, coming for example from input shaft 2, is no longer transmitted through driver disks 30 to plates 31 by means of plate carrier 10, for example to output shaft 3. First ramp element 26 is movably supported by needle bearing 35 in relation to output shaft 3. In the normal state, when diaphragm spring 13 is not being pressed, pilot clutch 6 is engaged, so that first ramp element 26 is driven and clamping element 28 overcomes the force of bias spring 29 and engages second ramp element 27, which is simultaneously designed as a friction element of main clutch 8. In order that no sudden change of the selector position of clamping element 28 occurs in the event of a reversal of the torque path to the opposite direction when a torque is present from the input shaft to the output shaft, torque sensor 14 is provided between output shaft 3 and plate carrier 10, which causes a reduction of the clamping force by clamping element 28 corresponding to the decrease of the torque of input shaft 2.

Figure 2:
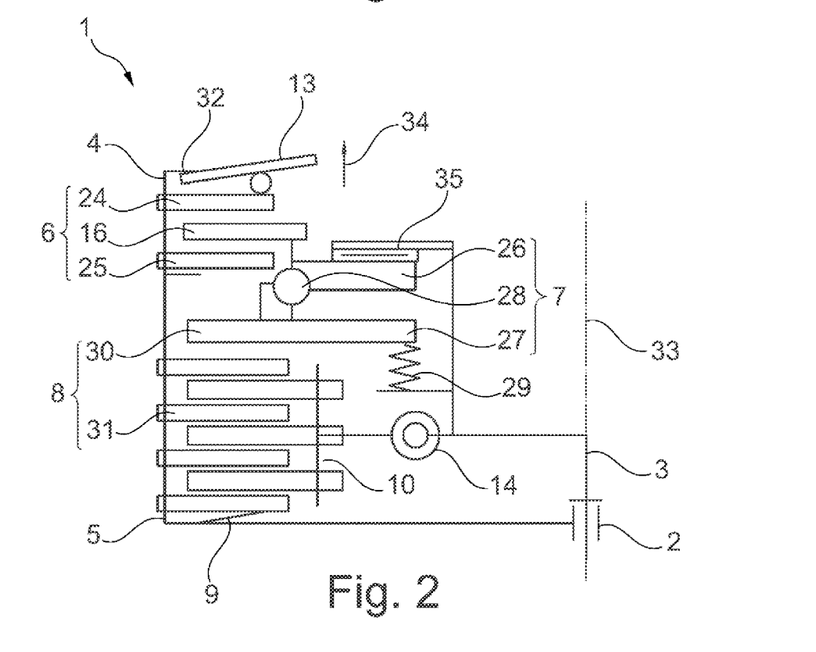
FIG. 2 is a diagram of a pull-type two-stage clutch.

FIG. 2 shows a diagram of two-stage clutch 1 proposed here, which is shown here in a pull version. In this case, the principle of the series connection of pilot clutch 6 and main clutch 8 is identical to the above description of FIG. 1. Contrary to FIG. 1, pilot clutch 6 is disengaged by pulling diaphragm spring 13 in activation direction 34. Here, contact point 32 of diaphragm spring 13 is located outside and on the inner side of clutch cover 4. Clutch cover 4 can therefore be equipped with a significantly greater inside diameter, so that clutch cover 4 becomes lighter and the rotating mass is reduced. In addition, clutch cover 4 is firmly connected to clutch basket 5; that is, clutch cover 4 is fixed on clutch basket 5 both rotationally and axially. In this example, pilot clutch 6 is designed with clamping plate 24 on which the diaphragm spring acts, counter plate 25 which is braced against clutch basket 5, and disk 16 positioned between them. Disk 16 is firmly connected to first ramp element 26 of ramp system 7. In this example, modulating spring 8 is situated between driver disk 31 of main clutch 8 and clutch basket 5, and acts here with a modulating effect on the entire operation of two-stage clutch 1.

Figure 3:
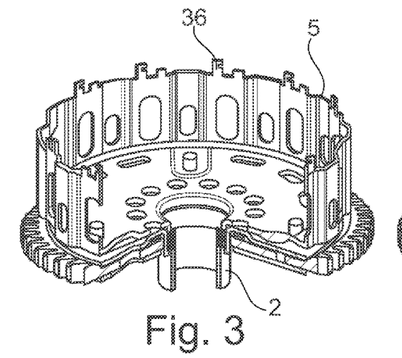
FIG. 3 is step 1 of installing new plates.
Figure 4:
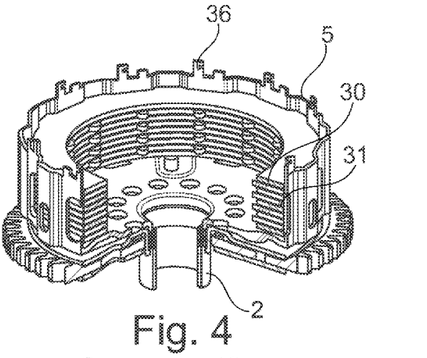
FIG. 4 is step 2 of installing new plates.
Figure 5:
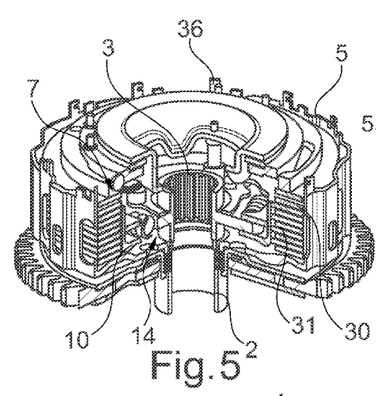
FIG. 5 is step 3 of installing new plates.
Figure 6:
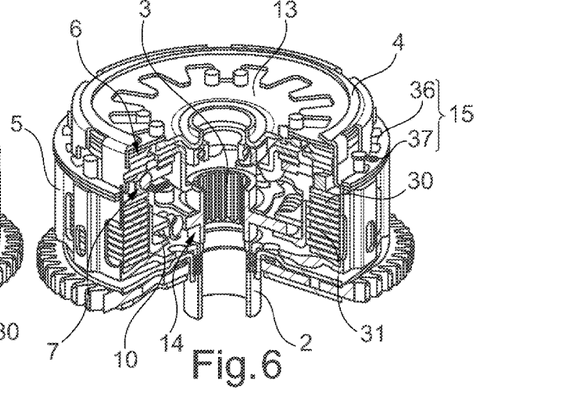
FIG. 6 is step 4 of installing new plates.
Figure 7:
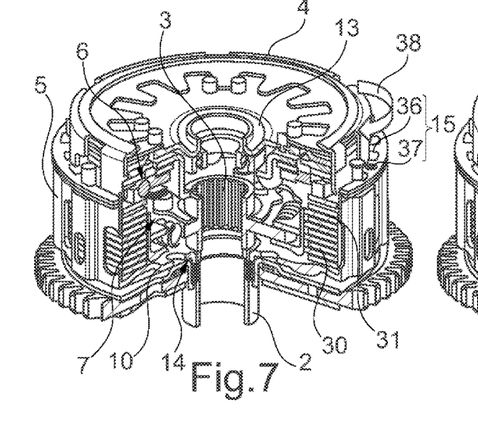
FIG. 7 is step 5 of installing new plates.
Figure 8:
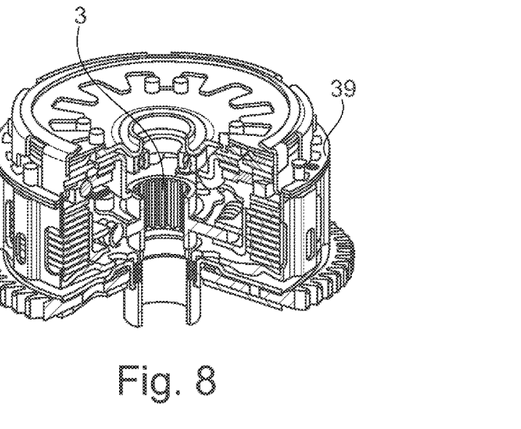
FIG. 8 is step 6 of installing new plates.

FIGS. 3 through 8 show the steps 1 through 6 that are necessary in order to insert a new plate pack for main clutch 8. In FIG. 3, pilot clutch 6, ramp system 7 and the old plate pack have already been removed. The only thing still shown is clutch basket 5 with bayonet lugs 36, which is connected to input shaft 2. It should be pointed out here that these elements shown in FIG. 3 do not have to be removed from the motor vehicle. In FIG. 4, new plates 31 and driver disks 30 are placed in the plate basket. In FIG. 5, first ramp element 26 together with torque sensor 14 and plate carrier 10 of main clutch 8 have been inserted. Output shaft 3 or a connection for it has also already been inserted here. Advantageously, these elements which have been inserted in step 3 are designed as a cohesive separate module, which in itself does not have to be disassembled for this purpose. FIG. 6 shows the fourth step, in which clutch cover 4 with its bayonet openings 37 is placed on bayonet lugs 36 of clutch basket 5. At the same time, diaphragm spring 13 and pilot clutch 6 are attached. The elements of the fourth step preferably also make a separate module, which in itself does not have to be disassembled for this purpose. In FIG. 7, clutch cover 4 is now also twisted in locking direction 38 relative to clutch basket 5, so that bayonet lugs 36 with their undercuts fix clutch cover 4 axially. Finally, in step 6 of FIG. 8 retaining screw 39 is installed, which prevents clutch cover 4 from turning in relation to clutch basket 5 and thus secures bayonet lock 15. Steps 4 through 6 are depicted once again in detail in FIG. 10.

Figure 9:
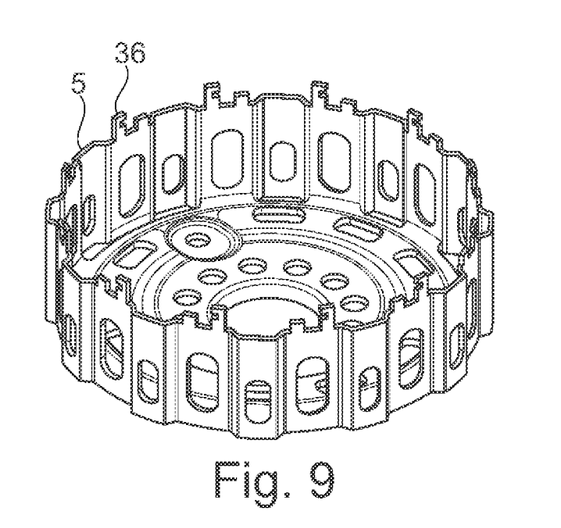
FIG. 9 is a rolled clutch basket.

FIG. 9 shows suitable clutch basket 5 which is fabricated by cold rolling. It has a plurality of stiffening elements and material reductions, so that the mass of clutch basket 5 with bayonet lugs 36 is significantly lower than conventional clutch baskets that are produced by bending processes and have to be provided with one or more burst protection rings.

Figure 10:
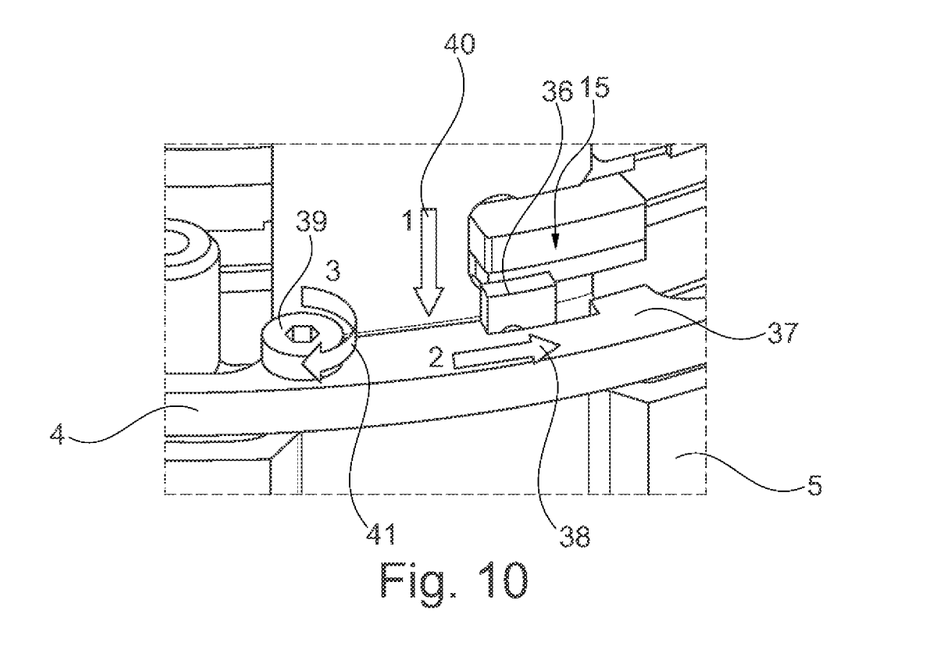
FIG. 10 is a bayonet lock between clutch cover and clutch basket.

FIG. 10 shows a detail of bayonet lock 15 and its operating principle. Clutch cover 4 has bayonet opening 37, which is large enough so that bayonet lug 36 of clutch basket 5 can be inserted into it in an assembly direction. By turning bayonet opening 37 in locking direction 38 in relation to bayonet lug 36, clutch basket 4 is introduced into the undercut in the latter. Clutch cover 4 is thus fixed axially on clutch basket 5, and no additional force is needed in order to hold clutch cover 4 on clutch basket 5 against the clamping forces in two-stage clutch 1. Finally, retaining screw 39 is screwed in tightening direction 41, so that clutch cover 4 is securely fixed on clutch basket 5.

Figure 11:
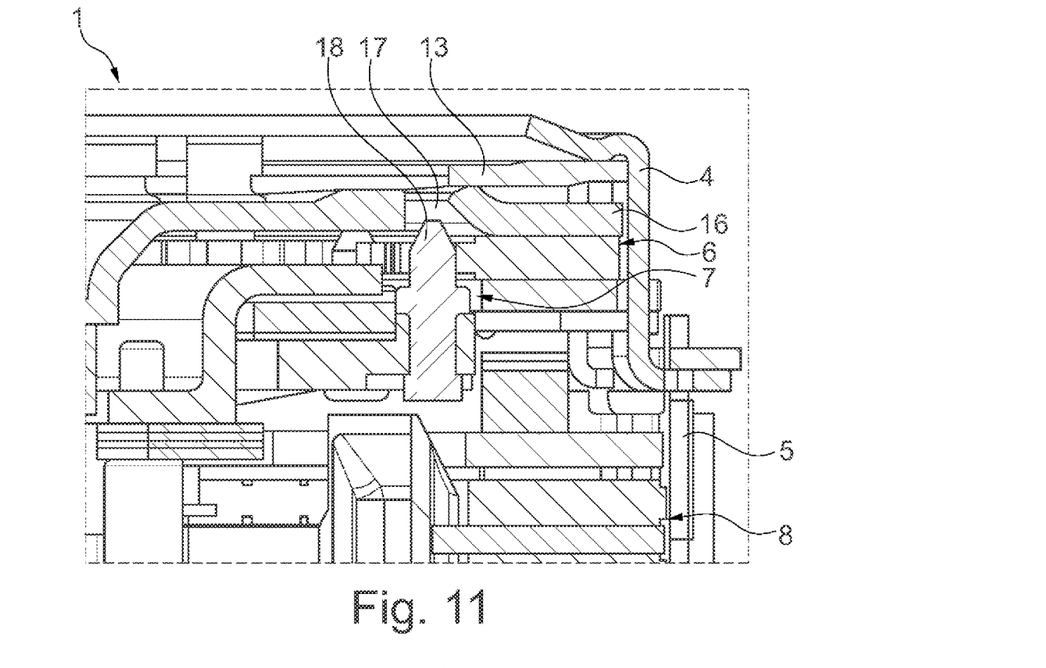
FIG. 11 is a ramp system with a pin.

FIG. 11 shows a detail of two-stage clutch 1 in which pin 18 is provided on ramp system 7. Pin 18 can be inserted into opening 17 in disk 16 of pilot clutch 6. Therefore, the position of clutch cover 4 relative to clutch basket 5, the position of pilot clutch 6 relative to clutch cover 4 and the position of pilot clutch 6 relative to ramp system 7 are easily found and defined, so that no damage to main clutch 8 can result from an incorrect position of ramp system 7. The openings can be distributed at regular intervals on disk 16, so that a plurality of discrete positions of ramp system 7 are possible.

Figure 12:
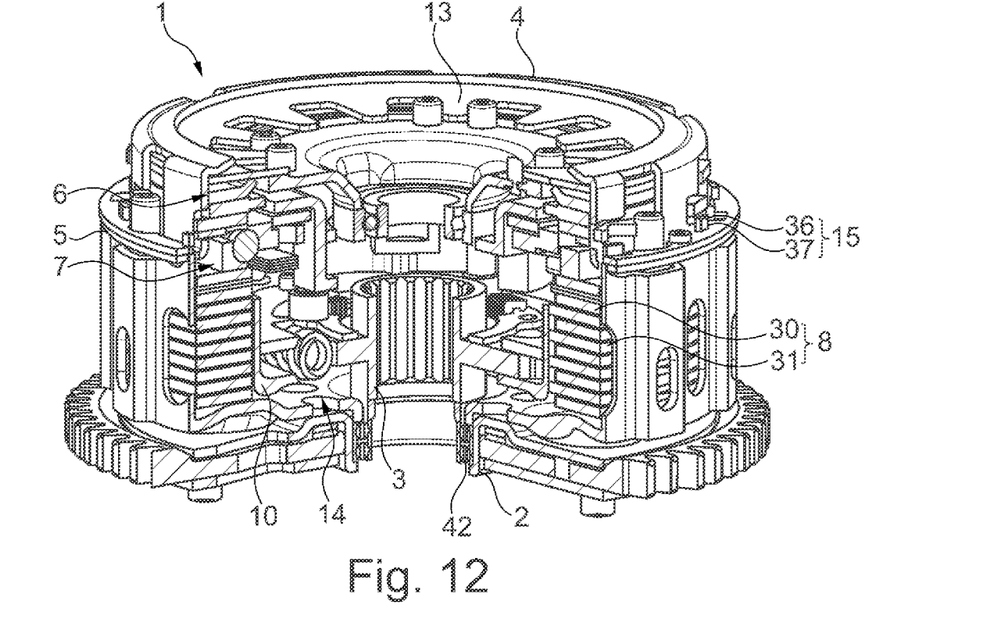
FIG. 12 is a two-stage clutch with thrust bearing.

FIG. 12 shows two-stage clutch 1 in which the schematic diagram in FIG. 2 has been realized. In this configuration, output shaft 3, which is connected to plate carrier 10 through the torque sensor, can be braced in relation to input shaft 2 by means of thrust bearing 42. As a result, the engaging and disengaging forces coming from diaphragm spring 13 in clutch cover 4, which is firmly connected to clutch basket 5 by means of bayonet lock 15 with bayonet lug 36 and bayonet opening 37, are introduced into input shaft 2 through pilot clutch 6, ramp system 7 and driver disks 30 and plates 31 of main clutch 8.

Figure 13:
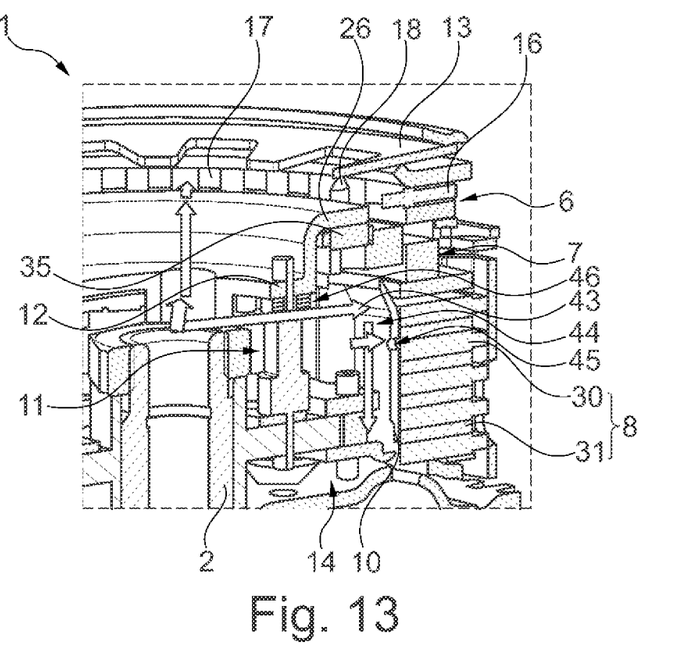
FIG. 13 is a window for liquid coolant; and,
FIG. 14 is a motorcycle having a two-stage clutch.

FIG. 13 shows a detail of two-stage clutch 1 in which window 11 is provided in transmitting element 12 from first ramp element 26 to torque sensor 14. This enables a liquid coolant to also flow in flow direction 43 through window 11 formed by means of supporting flange 46 into oil pan 44 formed by plate carrier 10 having a plurality of bored holes 45, and thus directly to driver disks 30 and plates 31 of main clutch 8. Furthermore, regular openings 17 are visible in disk 16, into which a pin of first ramp element 26 can be inserted and thus can be guided to a discrete position.

Figure 14:
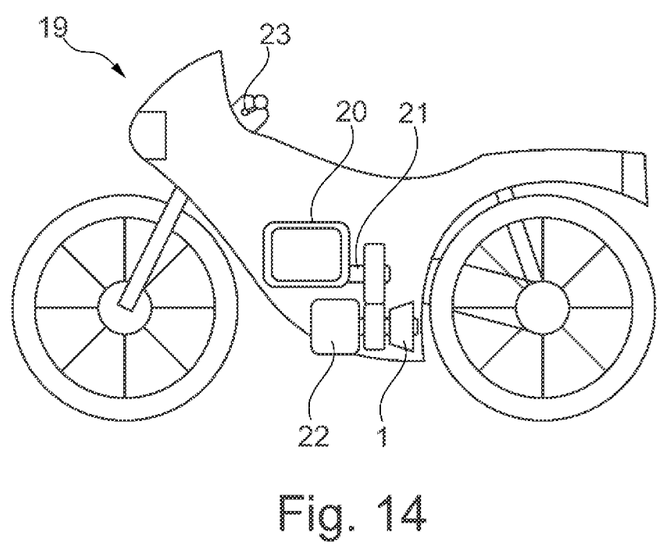

FIG. 14 shows a purely schematic depiction of motorcycle 19 having drive unit 20. The drive unit delivers a torque through drive shaft 21, or in deceleration mode it absorbs a torque through drive shaft 21. Drive shaft 21 is connected through schematically depicted gears to two-stage clutch 1, which connects it separably to drivetrain 22, of which only a transmission is shown here. Because of the series connection of pilot clutch 6 and main clutch 8, not shown here, two-stage clutch 1 can be operated by hand by means of hand-operated lever 23, although the drive unit puts out a very high torque which requires a considerable clamping force.

With the two-stage clutch proposed here, high torques can be transmitted despite small external operating forces. At the same time, the construction and assembly are greatly simplified in spite of the considerable complexity of the two-stage clutch, and the two-stage clutch has a significantly reduced rotating mass.

REFERENCE LABELS

1 Two-stage clutch
2 Input shaft
3 Output shaft
4 Clutch cover
5 Clutch basket
6 Pilot clutch
7 Ramp system
8 Main clutch
9 Modulating spring
10 Plate carrier
11 Window
12 Transmitting element
13 Diaphragm spring
14 Torque sensor
15 Bayonet lock
16 Disk
17 Opening
18 Pin
19 Motorcycle
20 Drive unit
21 Output shaft
22 Drivetrain
23 Hand-operated lever
24 Contact plate
25 Counter plate
26 First ramp element
27 Second ramp element
28 Clamping element
29 Bias spring
30 Driver disk
31 Plate
32 Fulcrum
33 Axis of rotation
34 Activation direction
35 Needle bearing
36 Bayonet lug 37 Bayonet opening
38 Locking direction
39 Retaining screw
40 Assembly direction
41 Tightening direction
42 Thrust bearing
43 Flow direction
44 Oil pan
45 Bored hole
46 Supporting flange

The invention claimed is:

1. A two-stage clutch for separable connection of an input shaft to at least one output shaft, comprising:
a clutch cover;
a clutch basket connected to the clutch cover;
a plurality of partial clutches arranged in series, the plurality of partial clutches including:
a first partial clutch including a pilot clutch which is actively operable; and,
a second partial clutch including a main clutch which is operable by:
the pilot clutch; and,
an operating force for the main clutch being produced by a torque transmitted by the input shaft or the at least one output shaft; and,
a torque sensor connecting the main clutch to the output shaft.

2. The two-stage clutch according to claim 1, wherein a modulating spring is arranged between the clutch basket and a plate carrier of the main clutch to modulate a transmission of power when operating one of the first or second partial clutches.

3. The two-stage clutch according to claim 1, wherein the two-stage clutch is a wet friction clutch.

4. The two-stage clutch according to claim 3, wherein a liquid coolant can be brought into the main clutch from a hollow shaft through at least one window in a transmitting element between the pilot clutch and the main clutch.

5. The two-stage clutch according to claim 1, wherein the clutch basket is fabricated by cold rolling.

6. The two-stage clutch according to claim 5, wherein the clutch basket is fabricated with a reduced mass.

7. The two-stage clutch according to claim 5, wherein the clutch cover is connectible and fixable on the clutch basket by means of a bayonet lock.

8. The two-stage clutch according to claim 7, further comprising a plurality of openings in a disk of the pilot clutch which correspond to at least one pin on the main clutch.

9. The two-stage clutch according to claim 1, wherein the pilot clutch can be operated by pulling by means of a diaphragm spring.

10. The two-stage clutch according to claim 9, wherein the pilot clutch forms a separate component.

11. The two-stage clutch according to claim 9, wherein a transmitting element can be centered between a first ramp element and the main clutch by means of the diaphragm spring.

12. The two-stage clutch according to claim 9, wherein a clamping force that is produced is absorbed in the clutch basket.

13. The two-stage clutch according to claim 12, wherein the torque sensor is not detachable from a ramp system without destruction.

14. A motorcycle comprising a drive unit with a second output shaft, a drivetrain, and the two-stage clutch according to claim 1 to connect the second output shaft to the drivetrain separably.

15. The motorcycle according to claim 14, wherein the two stage clutch is operable by hand.

16. A two-stage clutch for separable connection of an input shaft to at least one output shaft, comprising:
a clutch cover;
a clutch basket connected to the clutch cover;
a plurality of partial clutches arranged in series, the plurality of partial clutches including:
a first partial clutch including a pilot clutch which is actively operable; and,
a second partial clutch including a main clutch which is operable by:
the pilot clutch; and,
an operating force for the main clutch being produced by a torque transmitted by the input shaft or the at least one output shaft;
wherein the pilot clutch comprises a disk including a plurality of openings that correspond to at least one pin on the main clutch.

17. A two-stage clutch for separable connection of an input shaft to at least one output shaft, comprising:
a clutch cover;
a clutch basket connected to the clutch cover;
a plurality of partial clutches arranged in series, the plurality of partial clutches including:
a first partial clutch including a pilot clutch which is actively operable; and,
a second partial clutch including a main clutch which is operable by:
the pilot clutch; and,
an operating force for the main clutch being produced by a torque transmitted by the input shaft or the at least one output shaft; and,
a torque sensor that is not detachable from a ramp system without destruction.

* * * * *